UNITED STATES PATENT OFFICE.

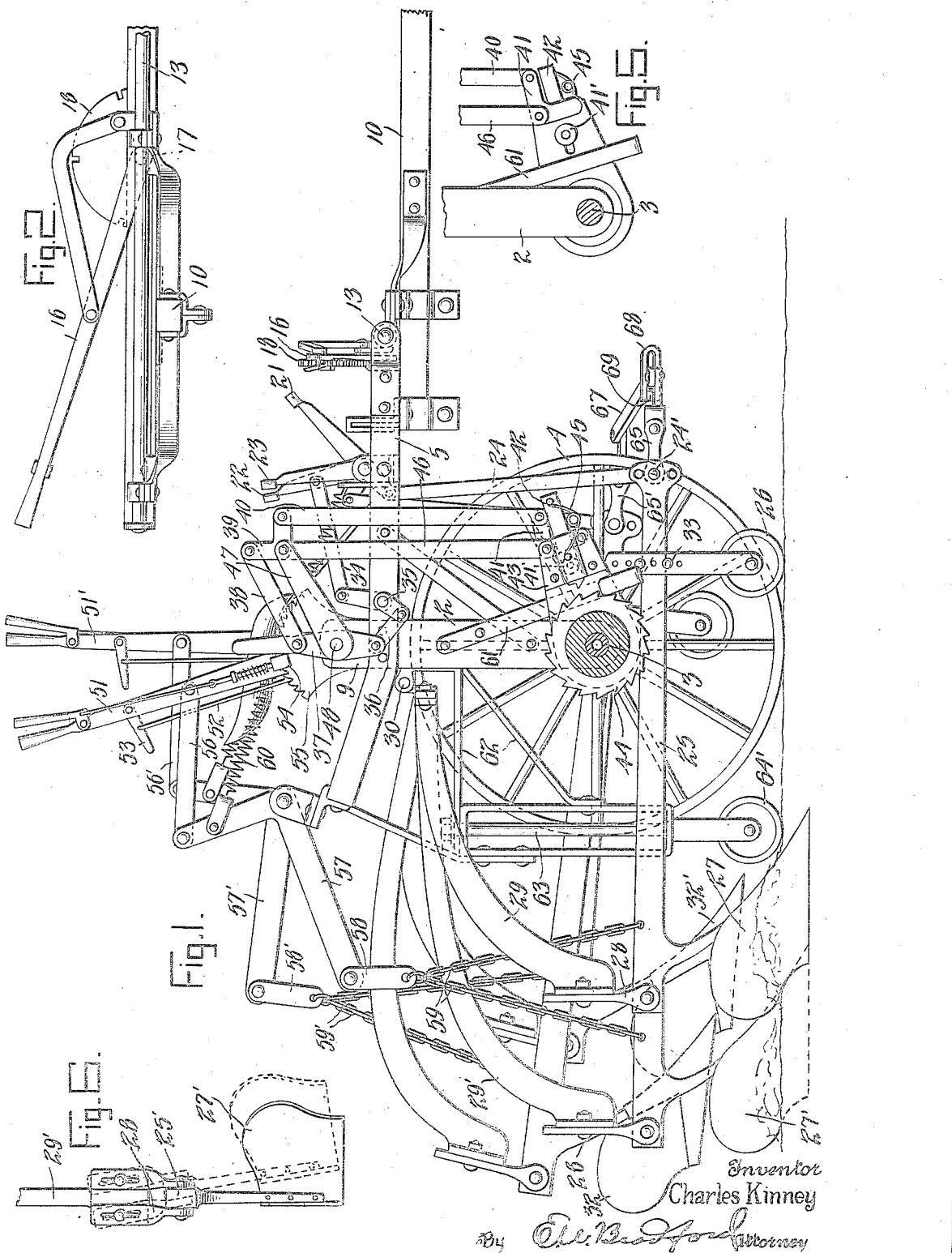

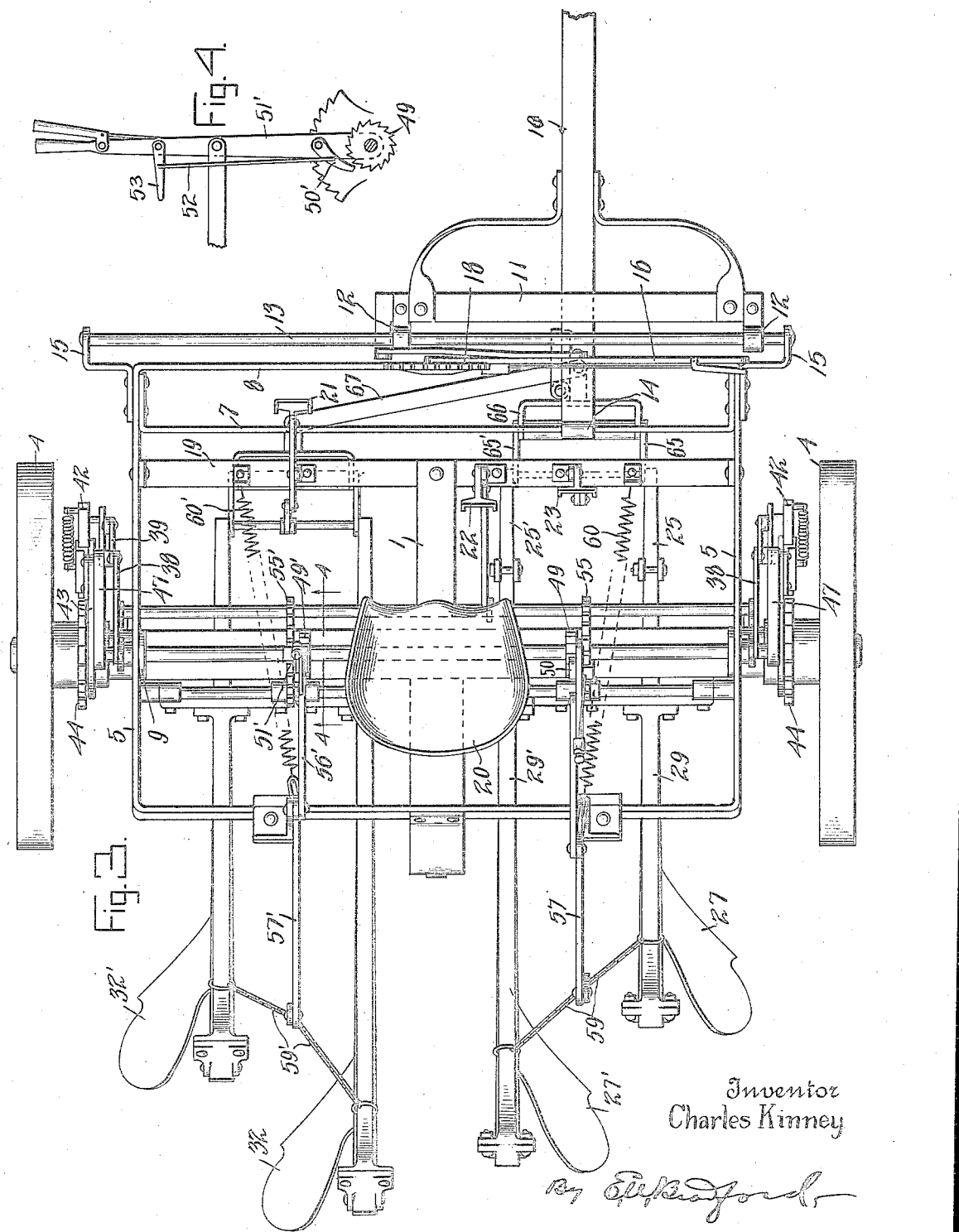

CHARLES KINNEY, OF ELMIRA HEIGHTS, NEW YORK, ASSIGNOR, BY MESNE ASSIGNMENTS, OF ONE-THIRD TO LOUISE MAYE OSTRANDER, OF ELMIRA, NEW YORK.

SULKY PLOW.

1,420,108.          Specification of Letters Patent.      Patented June 20, 1922.

Application filed September 15, 1920. Serial No. 410,352.

*To all whom it may concern:*

Be it known that I, CHARLES KINNEY, a citizen of the United States, residing at Elmira Heights, in the county of Chemung and State of New York, have invented certain new and useful Improvements in Sulky Plows, of which the following is a specification.

My said invention has for one of its objects to produce a gang sulky plow which will eliminate dead furrows in plowed fields.

Another object is to eliminate side draft in a gang plow.

Another object is to enable the plows to be raised out of the ground without strain on the operator and to provide an easy riding device thus enabling women and boys to perform this branch of farm work as well as men.

Another object is to permit the individual plows to be slightly tilted for better turning over the earth so as to cover stubble or weeds.

Referring to the accompanying drawings, which are made a part hereof and on which similar reference characters indicate similar parts, Figure 1 is a vertical section of the machine on line 1—1 of Figure 2, Figure 2 a detail front view,

Figure 3 a plan,

Figure 4 a section on line 4—4 of Figure 3 showing a lever used in the machine,

Figure 5 a view of a portion of Figure 1, taken from the opposite side, and

Figure 6 a rear view of an individual plow.

The frame of the machine consists essentially of an arched axle having a transverse member 1 and uprights 2, braced and fastened together in any convenient manner. At the lower ends of members 2 are stub shafts 3 for wheels 4. The frame also includes horizontal side members 5, rear bar 6 fast thereto and parallel front bars 7 and 8, fast to upward extensions 9 of member 2, and all reinforced and braced together in any approved style.

The tongue 10 is supported for transverse sliding movement by a crosspiece 11 supported on two bearing members 12 slidable on a bar 13, and a rear bearing 14 slidable on frame member 7. The slot in bearing 14 is somewhat deeper than the width of bar 7. Bar 13 is pivotally mounted in brackets 15, 15 at the sides of the frame, said pivotal mounting, and loose bearing 14 permitting limited swinging movement of the tongue in an up and down sense. This arrangement in connection with other devices presently to be described permits the point of application of power, as by horses, a tractor or other means, to be shifted from one side to the other of the gang plow.

On a cross piece 19 of the frame attached to side members 5, 5 is a seat 20 and pivoted on the same uprights attached to the cross piece are foot-levers 21, 22 and 23. A link 24 is attached at one end to foot-lever 23 and at the other to a rod 24' extending between 25 and 25' which carry the usual rollers 26, or coulters if desired, and plows 27 and 27'. Beams 25 have connecting devices 28 and 28' pivotally connected thereto and these are adjustably secured to beams 29—29' by bolts passing through adjusting slots (Fig. 6). By loosening these bolts a plow can be tilted about a horizontal axis to vary the position of the moldboard relative to the earth as it is turned over, rendering it possible to better cover up weeds and stubble or the like where desirable. The beams 29, 29' with the plows carried thereby are pivoted to the axle by a rod 30 mounted in bearings attached to member 1 and extending across the frame of the machine through bearings at the upper end of parts 29, 29'.

By means of the appropriate foot-lever 23 the plow beams 25, 25' of either set may be elevated at the front end so as to run the plows out of the ground, as for turning a corner.

The depth at which the plows run will be determined by adjustments at 33 on the coulter supports, and at 24', each in obvious manner.

The plows 32, 32' are supported just as plows 27, 27' and elevated in the same way by foot-lever 21 and further description is deemed unnecessary.

To avoid the formation of dead furrows in the body of the field the plow may be operated directly back and forth at one side of a field, one set of plows being used when going in one direction and another set when going in the opposite direction, thus turning the soil in the same direction at all times, from one side of the field to the other. The mechanism for obtaining this result will now be described.

Foot-lever 22 is connected by link 34 to a rock-arm on shaft 35 extending across the frame. Another rock-arm on said shaft is connected to a pawl 42 by a train of mechanism consisting of a link 36, lever 37 pivoted on shaft 48, link 38, bent lever 39, link 40, and cam 41. Pawl 42 is slidably mounted in bracket 43, loosely mounted on wheel 4 by a hub surrounding the hub of the wheel, and the pawl is normally held out of engagement with a ratchet 44 fixed to wheel 4, by spring 45, while a follower 41' may be acted on by cam 41 to move the pawl into engagement with its ratchet.

Connected to bracket 43 at a point remote from its pivot is a link 46, the other end of which is connected to an arm 47 on shaft 48, journaled in uprights 9. This shaft also has fast to it ratchet wheels 49, 49'. Pawls as 50, 50' on hand-lever 51, 51' (Fig. 4) are adapted to engage the ratchets.

These pawls have links 52 and thumb-pieces 53, the latter adapted by their frictional engagement with levers 51, 51' to hold their pawls out of operative position.

The hand-levers carry detents as 54 (Fig. 1), to engage racks 55, 55', fixed on upright brackets extending from member 1. The plows may be raised by operation of the hand-levers through links 56, 56', fixed on bent-levers 57, 57', links 58, 58' and branched chains 59, 59' extending from the links to the plows.

Springs 60, 60' attached at one end to the upper-arms of levers 57, 57' and at their opposite ends to brackets on cross-piece 19, act in a direction to lift the plows and so enable the operator to lower them easily as he does not have to hold the entire weight of the plows at any time. The plows are lowered by disengaging detent 54 of either set from rack 55 and lowering away, the pawl 50' of that set being in engagement with its ratchet, but the levers 51 and 51' being free on the shaft.

These connections may be varied within the bounds of mechanical skill as by extending the chains to the levers 57, 57' and attaching them directly thereto, by substituting levers of other shapes for the bent levers shown, and in general, throughout the machine I do not limit myself to the exact embodiment here shown, this being merely a preferred form of my invention. It may be noted also that the use of chains at this point causes the plows to operate independently up and down, so that if one plow rises out of the ground for any reason, as, e. g., on striking a stone, the other need not rise with it.

Assuming the plow to be nearing one end of the field with plows 27, 27' in operation, the operator will first move the thumb piece 53 to carry pawl 50 into engagement with its ratchet if it is not already down, then he will operate a foot lever as 23 to tilt the plows so they will run out of the ground. As he moves the foot-lever 23 or directly thereafter he will move foot-lever 22, which causes both pawls 42 to engage their ratchets. The wheels 4 to which the ratchets are attached will now swing brackets 43 and through connections 46, 47, 48, 49, 50, 51, 56, 57, 58 and 59 lift plows 27, 27' by power transmitted from wheels 4, both wheels 4 acting to lift the working plow or set of plows out of the ground. It will be noted that levers 37 extend up some distance above the point of attachment of links 38, whereby the operator may engage the mechanism to lift the working plow or set of plows while walking at either side of the machine as well as by the use of the foot lever 22.

As the plows reach the desired elevation, the pawl 54 snaps into a notch on rack 55, and the followers 41 on the pawls 42 ride against cam members 61 depending from member 2 in such relation as to disengage the pawl from its ratchet at the proper time; when the plows will be held out of the ground in the position shown.

The operator now turns the machine around, returns foot-lever 22 to its former position, lowers plows 32, 32' by simply operating the thumb-latch on lever 51' and raises the thumb-piece 53 at the opposite side of the machine, to insure disengagement of the pawl and its ratchet. These pawls are automatically moved to some extent when the hand-levers are swung back, carrying the ratchets with them, but it is desirable to move them to each extreme position by hand to insure their operation. It will be evident that damage might ensue if the pawl corresponding to the inactive plows were left in engagement with its ratchet when the other plows are raised as the hand-lever, being in its extreme position would act to prevent movement of the positively driven ratchet.

At the rear of the frame is a bracket 62, having bearings in which is supported a shaft 63 carrying a roller 64' acting as a third wheel to support the frame. If desired I may substitute for the swiveled shaft a fixed shaft at the lower end of which may be swiveled a support for the roller 64'.

To the front end of each plow-beam 25 and 25' is connected a clevis 65, 65' and the clevises are connected by a yoke 66. A similar connection is used at the forward end of the beams of plows 32 and 32'. The two yokes are connected by a bar 67 attached to each of them and a link 68 slides on the bar, a roller 69 being placed at the back of the bar to give free movement. When lever 16 is moved to shift the tongue of the machine from one side to the other, link 68 which constitutes a draft device for a tractor or horses or the like, also moves across the machine thus bringing the application of power in front of the operative set of plows at each change of operations.

It is to be noted that the draft on the machine is through draft device 68 and its connected parts to plow-beams 25, 25', and thence to the plows 27, 27' on the one hand and through members 28, 28' on the other hand to beams 29, 29', pivot 30 and so to the frame to push the same. This arrangement is advantageous to cause the plows to enter the ground when starting the furrow, the draft being directly to the plow, and not through the frame to the plow. It also serves to steady the plow and hold it to its depth in hard or stony ground, and permits the frame to ride smoothly and without undue fatigue to the operator.

While I have shown two gangs of plows each gang consisting of two plows I may use a single plow in each gang, or three or more, according to circumstance. Various details are also subject to change within the scope of my invention, which is defined in the appended claims.

Having thus fully described my said invention, what I claim as new and desire to secure by Letters Patent, is:

1. In a gang-plow the combination of, a frame, a plurality of plows thereon, all the plows pointing in the same direction, a draft device and steering means at the front of the frame, and means to shift the steering means and draft device independently of each other transversely of the frame.

2. In a gang plow the combination of, a frame, a plurality of plows thereon, all of the plows pointing in the same direction, a draft device and steering means at the front of the frame, means to shift the steering means from side to side of the frame to align with the active set of plows, the draft device being free to move independent of the steering means, substantially as set forth.

3. In a gang-plow the combination of, a frame, a draft link attached to the frame, a plurality of plows thereon, means whereby the plows at opposite sides of the frame may be alternately placed in operative position, a steering tongue, and means for moving the tongue into the line of draft of the operative plow or plows, said means being independent of any motion of the draft link, substantially as set forth.

4. In a gang-plow the combination of, a frame, a plurality of plows thereon, all the plows pointing in the same direction means whereby the plows at opposite sides of the frame may be placed alternately in operative position, a lever pivoted at the front of the frame, connections from the lever to the steering means, whereby said means may be shifted transversely of the frame into line with the operative plows, a rack on the frame to engage a detent on the lever to hold the lever in adjusted position, and a draft device adapted to shift independently of the steering means.

5. In a gang plow, a frame, a plurality of plows carried thereby and adapted to operate alternately or simultaneously, manually operated levers on the frame, connections between each lever and one or more plow beams to raise the respective plows out of the ground, an independent lever, and means controlled by said lever whereby the plows may be selectively and automatically raised out of the ground, substantially as set forth.

6. In a gang plow, a frame, a plurality of plows carried thereby and adapted to operate simultaneously or alternately, a plurality of foot levers on the frame, certain of said levers being connected to certain plow beams to raise the respective plows out of the ground when operated, and means controlled by another of said levers whereby the plows may be automatically and selectively raised out of the ground, substantially as set forth.

7. In a sulky plow, a frame, oppositely facing plows at opposite sides of the frame, independent manually operated means for raising the plows at opposite sides of the frame and a single automatic means adapted to be connected to the plows at either side of the frame for raising them out of the ground, substantially as set forth.

8. In a sulky plow, a frame, oppositely facing plows at opposite sides of the frame, independent manually operated means for raising the plows at opposite sides of the frame, a single automatic means adapted to be connected to the plows at either side of the frame for raising them out of the ground, independent means for retaining the plows at each side of the machine in inoperative position and manually controlled means for returning them to operative position, substantially as set forth.

9. In a sulky plow, a frame, a lever on the frame, connections between the lever and the plow-beam to raise the plow out of the ground, a second lever, a wheel on the frame and means comprising a ratchet on the wheel and a pawl for engagement therewith for transmitting the movement of the wheel to the plow to lift the same out of the ground, and means for controlling said pawl operable by said second lever, substantially as set forth.

10. In a sulky plow, means for raising the plow out of the ground comprising a foot lever, means connecting the lever to the plow beam, a second foot lever, a wheel running on the ground, a ratchet fast to the wheel, a bracket pivoted on the axle of the wheel, a pawl thereon, connections from the second foot lever to the pawl for operating it to engage the ratchet, and connections from the bracket to the plow.

11. In a sulky plow, means for raising the plow out of the ground comprising a foot lever, connections between the lever and the plow beam, a second foot lever a wheel running of the ground, a ratchet fast to the wheel, a bracket pivoted on the axle of the wheel, a pawl thereon, connections from the foot lever to the pawl for operating it to engage the ratchet, means on the frame to disengage the pawl after a limited movement of the bracket, and connections from the bracket to the plow.

12. In a sulky plow, a device for raising the plow out of the ground comprising a foot lever, a wheel running on the ground, a ratchet fast to the wheel, a bracket pivoted on the axle of the wheel, a pawl thereon, connections from the foot lever to the pawl for operating it to engage the ratchet, a shaft mounted for rotation, connections from the bracket for moving the shaft, and means for locking the shaft in position.

13. In a sulky plow, a device for raising the plow out of the ground comprising a foot lever, a wheel running on the ground, a ratchet fast to the wheel, a bracket pivoted on the axle of the wheel, a pawl thereon, connections from the foot lever to the pawl for operating it to engage the ratchet, a shaft mounted for rotation, a hand lever fixed thereto, connections from the bracket for moving the shaft, and means adjacent the hand lever for holding it in adjusted position.

14. In a sulky plow, a frame, a plow suspended therefrom means for removing the plow from the ground comprising means to elevate the front end of the plow beam and means operated from a ground wheel of the frame for lifting the plow bodily.

15. In a sulky plow, a frame, a plow suspended therefrom, means for removing the plow from the ground comprising means to elevate the front end of the plow-beam, a pawl and ratchet device on a frame-supporting wheel, a hand-lever, means to lock the hand-lever in adjusted position, connections from the pawl to the hand-lever, and connections from the hand-lever to the plows, including flexible devices near the plows.

16. In a gang sulky plow, a plurality of plow units and means for raising them out of the ground comprising a hand lever, a rack bar for holding it in adjusted position, and connections between the hand lever and the plows including flexible means to permit independent movement of the plows.

17. In a plow lifting mechanism, a pawl and ratchet device, comprising a slidable pawl, a lug on the pawl, a pivoted cam to engage the lug, and move the pawl in one direction to engage the ratchet, stationary means to disengage the pawl from the ratchet, and a spring to hold it out of engagement.

18. In a gang plow, a frame, a plurality of gangs of plows all pointing in one direction, a wheel at each end of the frame, means connected thereto to lift the plows out of the ground comprising a shaft running across the machine, means adapted for selective actuation to connect either wheel to the shaft to rotate the shaft and connecting means attached to the gangs and adapted to be selectively connected to the shaft.

19. In a plow mechanism, a frame, a plurality of gangs of plows connected thereto; a wheel at each end of the frame, a bracket projecting rearwardly from the frame, a vertical shaft in the frame and a frame-supporting wheel swivelled thereon.

20. In a gang plow, a frame, a suspending beam pivoted thereto, a plow beam and connecting means interposed between the two beams and adaptable to tilt the plow beam and the attached plow about a horizontal axis.

21. In a gang plow, a frame, a suspending beam pivoted thereto, a plow beam, parallel links connecting the two beams, and independently adjustable vertically on the suspending beam to tilt the plow beam horizontally.

22. In a sulky plow, a frame, oppositely facing plows at opposite sides of the frame, a manually operable lever at each side of the frame for controlling the respective plows, an independent lever controlling automatic mechanism for raising the plows of either set out of the ground, said mechanism comprising a transversely extending shaft, connections from said shaft to the plow beams, means adapted to connect said shaft to a source of power to lift the plows and manually operated levers fixed to said shaft whereby the plows may be held in lifted position, substantially as set forth.

In witness whereof, I have hereunto set my hand and seal at Elmira, New York, this thirteenth day of September, A. D. nineteen hundred and twenty.

CHARLES KINNEY. [L. S.]

Witnesses:
 CHAS. N. HAMMOND,
 CHAS. B. SWARTWOOD.